United States Patent [19]

Schäfer

[11] 4,316,639
[45] Feb. 23, 1982

[54] BRAKING FORCE CONTROL DEVICE

[75] Inventor: Ernst D. Schäfer, Bad Nauheim, Fed. Rep. of Germany

[73] Assignee: ITT Industries, Inc., New York, N.Y.

[21] Appl. No.: 141,828

[22] Filed: Apr. 21, 1980

[30] Foreign Application Priority Data

Jul. 11, 1979 [DE] Fed. Rep. of Germany ....... 2927929

[51] Int. Cl.³ .............................................. B60T 8/02
[52] U.S. Cl. ................................................. 303/6 C
[58] Field of Search .................... 303/6 C, 6 R, 84 A; 188/349, 151 A

[56] References Cited

U.S. PATENT DOCUMENTS 3,727,991 4/1973 DeHoff et al. ...................... 303/6 C
3,787,096 1/1974 Shellhause ...................... 303/6 C X Primary Examiner—Douglas C. Butler
Attorney, Agent, or Firm—John T. O'Halloran; Alfred C. Hill

[57] ABSTRACT

A brake force control dievice for two-circuit brake system includes a controlling piston disposed in a constant diameter internal chamber of a housing coaxial of a longitudinal axis, a locking piston disposed in the internal chamber coaxial of the axis and within the controlling piston and a third piston disposed in the internal chamber coaxial of the axis and between the controlling piston and the locking piston. The third piston slides on the locking piston and the controlling piston slides on at least a portion of the third piston. The controlling piston reduces the pressure of the rear axle brake circuit in relation to the pressure of the front axle brake circuit and the locking piston acts on a control valve in case of failure of the front axle brake circuit in such a way that the reducing effect for the rear axle brake pressure is neutralized. This arrangement of the control device has a shorter overall length than prior art control devices where the controlling piston and the locking piston are arranged axially one behind the other.

16 Claims, 1 Drawing Figure

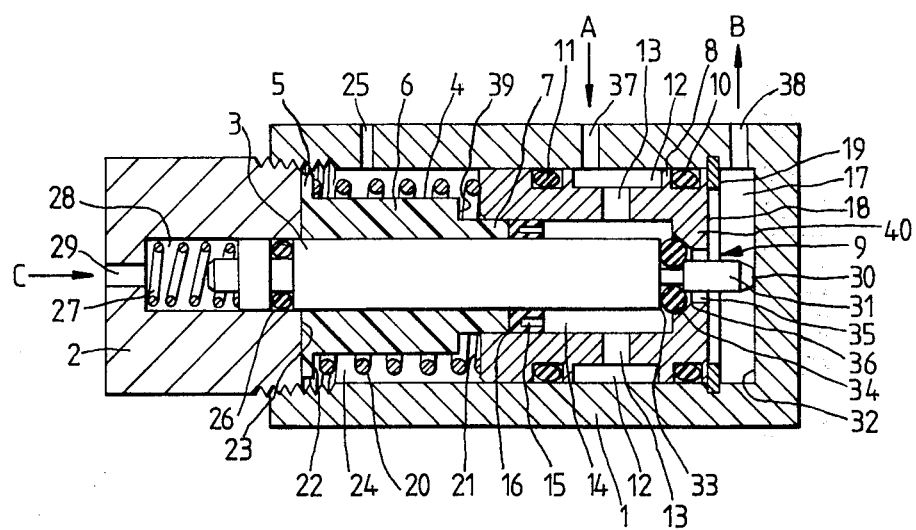

BRAKING FORCE CONTROL DEVICE

BACKGROUND OF THE INVENTION

This invention relates to a braking force control device for two-circuit brake systems, in which a first brake circuit is directly connected to the master brake cylinder without any change in pressure and a second brake circuit is connected to the master brake cylinder via a pressure modulating element of the control device. The brake pressure in the second brake circuit is changed in a relation determined by a controlling piston after a switching over pressure determined by the end surfaces of the controlling piston and the force of a control spring acting on the controlling piston has been exceeded. A locking piston operated hydraulically is incorporated in the control device for cancelling or locking the change in pressure in the controlled brake circuit when the uncontrolled brake circuit fails.

The braking force control device may be designed as single-stage or continuously working braking force device. The single-stage braking force control devices, which limit the pressure of the uncontrolled brake circuit to a certain value, are in general called braking force limiting devices. In these braking force limiting devices only one end surface of the control piston is applied with pressure, e.g. by the controlled pressure. A spring, which together with the surface applied with the pressure determines the switching over pressure, acts against the force produced by the controlled pressure. In the brake force control devices working continuously a second end surface is also applied with pressure, that is by the pressure to be controlled. The force produced by the pressure to be controlled acts in the same direction as the spring force.

An improved braking force control device having a short overall length is disclosed in copending U.S. Application Ser. No. 135,580, filed Mar. 31, 1980, assigned to the same assignee as the instant application, and whose disclosures is incorporated herein by reference. This control device is seated in a multiple-step housing which is closed by a plug. This plug has a coaxial channel for the pressure medium to be controlled.

SUMMARY OF THE INVENTION

An object of the present invention is to provide a braking force control device having a short overall length, which is an improvement over the control device of the above-cited copending application since it can be more easily produced, can be more easily assembled and is less costly in the both respects.

A feature of the present invention is the provision of a braking force control device for a two-circuit brake system comprising: a housing having a longitudinal axis and a constant diameter internal chamber coaxial of the axis; a controlling piston disposed in the internal chamber coaxial of the axis; a locking piston disposed in the internal chamber coaxial of the axis and surrounded by the controlling piston; a third piston disposed in the internal chamber coaxial of the axis and between the controlling piston and the locking piston, the locking piston being axially slidable in the third piston and the controlling piston being axially slidable on at least a portion of the third piston; and a prestressed control spring acting on the controlling piston to determine together with surfaces of the controlling piston subjected to braking pressure in one circuit of the brake system a switching pressure which when exceeded will cause the braking pressure in the one circuit of the brake system to be controlled; the locking piston being subjected to braking pressure in the other circuit of the brake system to cancel the control of the braking pressure in the one circuit of the brake system when the other circuit of the brake system fails.

Thus, the space between the locking piston and the controlling piston is separated by the third piston, so that the different surfaces of the controlling piston can be exposed to different pressures. Due to this arrangement of the three pistons, it is possible to arrange the three pistons in a housing in such a way that the interior longitudinal bore of the housing will have only one diameter, that is the longitudinal bore will not have steps therein. By a pre-stressed spring being arranged between the third piston and the controlling piston, the controlling piston in its rest position will keep the pressure-reducing or pressure-limiting control valve in an open position. At the same time the third piston is kept in its rest position against a wall of the braking force control device.

Instead of the third piston, a casing can be used which is held to a wall of the braking force control device only by means of the pressure of the hydraulic liquid. The spring for the controlling piston would then be supported by a stop in a housing of the braking force control device.

The travel of the controlling piston is advantageously limited by axial stops in both directions of movement. Thereby a defined position of the controlling piston is guaranteed for all operational cases.

Another feature of the present invention is that the third piston is a stepped piston having a first section of smaller diameter, a second section of larger diameter and a step therebetween. The controlling piston is slidably sealed to the first section and the step forms a stop for the controlling piston.

Still another feature of the present invention is that the locking piston includes a first portion having a first diameter, a second portion adjacent a portion of the controlling piston extending radially inward having a second diameter less than the first diameter and a step therebetween. The second portion of the locking piston extends through an aperture in the inwardly extending portion of the controlling piston. A sealing ring having a round cross-section is carried on the second portion adjacent the step. This sealing ring cooperates with a surface of the inwardly extending portion of the controlling piston to provide a simple form of a controlling valve. The sealing ring may either be located in a groove on the second portion of the locking piston, or may simply be clamped onto the second portion. The advantage of a sealing ring having a round cross-section is that the valve seat provided by surface surrounding the aperture in the inwardly extending portion of the controlling piston requires no special treatment, since the contact surface between the valve seat and sealing ring consists only of a line surrounding the aperture, that is, forms a line seal.

A further feature of the present invention is that the locking piston is applied with the uncontrolled pressure of a first brake circuit in a pressure chamber, which is disposed in a housing part which can be fixed to the housing of the braking force control device. This housing part is designed in such a way that the pressure chamber has the same diameter as the diameter of the locking piston. The locking piston is provided with a simple seal and as a result can be guided in a sealed manner in this pressure chamber. The housing part is furthermore advantageously designed in such a way that at the same time it closes the housing of the braking force control device and it also forms a wall against which the control spring of the controlling piston acts directly or indirectly. The housing part may further be designed to screw into the housing of the braking force control device. The distance the housing part is screwed into the housing of the braking force control device determines the prestressing of the control spring and, thus, the prestressing of the control spring can be continuously adjusted. It should be noted that the travel available to the controlling piston is not shorter than the valve-closing travel. Thus, the switch-on point of the control device is adjustable.

BRIEF DESCRIPTION OF THE DRAWING

The above-mentioned and other features and objects of the present invention and the manner of obtaining them will become more apparent by reference to the following description taken in conjunction with the drawing, the single FIGURE of which is a longitudinal cross-sectional view of a braking force control device in accordance with the principles of the present invention.

DESCRIPTION OF THE PREFERRED EMBODIMENT

Referring to the FIGURE, housing 1 of the braking force control device of the present invention is closed by a housing part 2 which can be screwed in. The interior chamber or longitudinal bore of housing 1 has only one diameter and, thus, can be produced easily and advantageously relative to costs. In the interior chamber three pistons 3, 4 and 8 are arranged coaxially with respect to one another. Locking piston 3 is surrounded by a stepped piston 4 which, without radial clearance, is in sliding contact with locking piston 3. At its circumference stepped piston 4 has two radial steps 22 and 39 dividing stepped piston 4 into three sections 5, 6 and 7. On section 7 having the smallest diameter of stepped piston 4 controlling piston 8 slides encompassing section 7. Thus, controlling piston 8 also surrounds locking piston 3. Together with locking piston 3 controlling piston 8 forms a pressure-reducing control valve 9. In contrast to stepped piston 4 which is inserted into housing 1 with a radial clearance, controlling piston 8 lies without radial clearance, but axially slidable in housing 1. By two sealing rings 10 and 11, which are arranged to the right and to the left of a groove 12 disposed into the circumference of controlling piston 8, the chamber formed by groove 12 is sealed with respect to the interior chamber of housing 1. By means of openings 13 which extend radially through piston 8 from the bottom of groove 12, groove 12 is connected to chamber 14 between locking piston 3 and controlling piston 8. Chamber 14 serves as a pressure inlet chamber and is bounded by means of a lip seal 15 formed in the manner of a ring sealed between controlling piston 8 and locking piston 3. Lip seal 15 axially abuts against the end surface 16 of stepped piston 4, its lips radially abutting against controlling piston 8 and against locking piston 3. By means of controlling valve 9, which is formed by locking piston 3 and a circular projection 40 of controlling piston 8 extending radially inward, chamber 14 can be closed and, thus, made liquid-tight. Controlling valve 9 can separate chamber 14 from an outlet chamber 17 which is defined by housing 1 and a front wall 18 of controlling piston 8. To give to controlling piston 8 a defined rest position and, thereby, a defined size to outlet chamber 17 controling piston 8 is held in its illustrated position by a stop ring 19.

The rest position of controlling piston 8 is achieved by a prestressed spring 20 which acts between controlling piston 8 and stepped piston 4. Spring 20 acts between end surface 21 of controlling piston 8 and step 22 of stepped piston 4. Stepped piston 4 is held in its rest position at wall 23 of screwed-in housing part 2 by spring 20.

A chamber 24 is disposed in the interior chamber of housing 1. Chamber 24 is defined by controlling piston 8, stepped piston 4, housing 1 and wall 23 of housing part 2 and is connected via an opening 25 to the atmosphere.

Locking piston 3 slides in housing part 2 and is sealed thereto by sealing ring 26. Piston 3 is held in its rest position shown by a spring 27. A pressure chamber 28 defined by locking piston 3 and housing part 2 is connected via an opening 29 to the pressure C of an uncontrolled brake circuit (not shown) of the two-circuit brake system. This brake circuit normally corresponds to the front axle brake circuit in motor vehicles.

In the illustrated rest position of locking piston 3 its end 30 of a section 31 having a smaller diameter than the rest of the locking piston abuts against housing wall 32 in outlet chamber 17. Section 31 is advantageously chamfered at its end. Thus, end 30 abutting against housing wall 32 is as small as possible, so that a surface as large as possible of locking piston 3 is applied with pressure present in outlet chamber 17. A step 33 which results between section 31 and the rest of braking piston 3 is located in inlet chamber 14 shortly before projection 40 of controlling piston 8, said projection extending radially to locking piston 3.

On section 31, directly before step 33, a sealing ring 34 is arranged which is circularly designed in its cross-section. Sealing ring 34 may also be located in a circular groove on section 31, said groove directly bordering behind step 33. Thus, step 33 itself can be used as a axial supporting edge for sealing ring 34.

Sealing ring 34 is already partly located in a passage opening 35 enlarging in the manner of a cone to chamber 14. Opening 35 is formed in projection 40 and the pressure medium can reach outlet chamber 17 from inlet chamber 14 through opening 35. Sealing ring 34 arranged on section 31 must have an external diameter greater than the internal diameter of opening 35. Only by this means can sealing ring 34 come into sealed engagement with the conical surface 36 of controlling piston 8 and close passage opening 35. Due to its circular cross-section, sealing ring 34 abuts against conical surface 36 only by a line contact, that is, there is no surface sealing. Therefore, conical surface 36 need not be a surface that is precisely formed.

The operation of the above arrangement is as follows. Via inlet 37 the uncontrolled pressure A of the master cylinder is fed into the controlling device and via outlet 38 the controlled pressure B is fed into the brake cylinders at the rear axle.

Upon achieving a certain pressure, the pressure acting on end 18 of controlling piston 8 in outlet chamber 17 will overcome the force of spring 20 and shift controlling piston 8 to the left against the spring force until control valve 9 is closed. The force shifting controlling piston 8 is produced, since in chamber 14 a smaller surface, that is a surface equal to the size of the surface of end 18 minus the surface of end 21, is exposed to the pressure. With a further increase in pressure, the pressure acting on the smaller surface in inlet chamber 14 will increase and again open control valve 9 for a short time. The pressure in outlet chamber 17 is increased until control valve 9 can close again. The pressure A, thus, is reduced to the pressure B in relation to the pressure-active surface at controlling piston 8 in inlet chamber 14 to the pressure active surface in outlet chamber 17.

During this controlling phase, controlling piston 8 will move, however, locking piston 3 will remain in its position shown. Despite the pressure acting on locking piston 3 in chambers 14 and 17, the force of spring 27 and the pressure C of the second brake circuit acting in chamber 28 will be suitable to hold locking piston 3, in case of control, in its position in an unchanged manner. The magnitude of pressure C will herein correspond to the magnitude of the pressure A. Only when the pressure C fails will locking piston 3 be shifted to the left, since the forces of the pressures A and B now acting on locking piston 3 can move the latter against the force of spring 27. In this way control valve 9 is opened, that is the braking reduction is stopped. Controlling piston 8 itself, due to its limited moveability can no longer close control valve 9. Even with higher pressure in chamber 17, controlling piston 8 can slide to the left only until its end 21 abuts against step 39 of stepped piston 4. Locking piston 3 can, however, as can be seen from the drawing, slide back considerably further to the left, so that in case of failure of pressure C a closing of control valve 9 becomes impossible. As a consequence, the pressure B will correspond to the uncontrolled pressure A. Thus, in motor vehicles which are equipped with a braking force control device of the type described an uncontrolled pressure for braking the rear axle will be available when the front axle brake circuit fails.

The embodiment shown can also be utilized as braking force limiting device. For this purpose opening 38 would have to be connected as an inlet and opening 37 as an outlet. From a switching point determined by the prestressing force of spring 20, control valve 9 closes by the sliding back of controlling piston 8 and will not open even when the pressure further increases. Only in case of circuit-failure of the pressure C will locking piston 3 cancel this limitation of braking force.

In the braking force control device of the present invention the switching point of the control can be determined by the prestressing force of spring 20. By adjusting the amount that housing part 2 is screwed into housing 1 the prestressing force can be continuously variably adjusted by tightening of spring 20. By changing the type of spring employed as spring 20, or by inserting spacers between spring 20 and wall 23 any prestressing force can be chosen.

The embodiment shown is only one of many possible embodiments, since by another support in the rest position of locking piston 3 other forms of the locking piston become possible. Then the control valve as well as the controlling piston may also have other embodiments.

While I have described above the principles of my invention in connection with specific apparatus it is to clearly understood that this description is made only by way of example and not as a limitation to the scope of my invention as set forth in the objects thereof and in the accompanying claims.

I claim:

1. A braking force control device for a two-circuit brake system comprising:
    a housing having a longitudinal axis and a constant diameter internal chamber coaxial of said axis;
    a controlling piston disposed in said internal chamber coaxial of said axis;
    a locking piston disposed in said internal chamber coaxial of said axis and surrounded by said controlling piston;
    a third piston disposed in said internal chamber coaxial of said axis and between the inner surface of said controlling piston and the other surface of said locking piston, said locking piston being axially slidable in said third piston on an inner surface thereof and said controlling piston being axially slidable on at least a portion of the outer surface of said third piston; and
    a prestressed control spring acting on said controlling piston to determine together with surfaces of said controlling piston subjected to braking pressure in one circuit of said brake system a switching pressure which when exceeded will cause said braking pressure in said one circuit of said brake system to be controlled;
    said locking piston being subjected to braking pressure in the other circuit of said brake system to cancel the control of said braking pressure in said one circuit of said brake system when said other circuit of said brake system fails.
2. A device according to claim 1, wherein
    said control spring is disposed coaxially of said axis between said controlling piston and said third piston.
3. A device according to claim 1, wherein
    said control spring is disposed coaxially of said axis between said controlling piston and a transverse end wall of said housing.
4. A device according to claim 1, wherein
    said controlling piston is limited in its axial movement in both directions by a pair of spaced stops.
5. A device according to claim 1, wherein
    said third piston is a stepped piston including
        a first portion having a first diameter upon which said controlling piston slides,
        a second portion having a second diameter greater than said first diameter,
        a first step between said first and second portions providing one of a pair of spaced stops limiting the axial movement of said controlling piston in both directions,
        a third portion having a third diameter greater than said second diameter, and
        a second step between said second and third portions.
6. A device according to claim 5, wherein
    said control spring is disposed coaxially of said axis about said second portion between said second step and the adjacent end of said controlling piston.
7. A device according to claim 6, wherein
    the other of said pair of spaced stops is a ring transverse of said housing adjacent the end of said controlling piston remote from said first step.
8. A device according to claim 5, wherein
    the other of said pair of spaced stops is a ring transverse of said housing adjacent the end of said controlling piston remote from said first step.
9. A device according to claim 1, wherein
    said controlling piston includes a circular projection extending radially inward adjacent an outlet to said one circuit of said brake system;

said locking piston includes
a first section having a given diameter extending through said circular projection,
a second section having a diameter greater than said given diameter, and
a step between said first and second sections; and
a sealing ring disposed on said first section adjacent said step cooperating with an adjacent surface of said circular projection to provide a control valve.

10. A device according to claim 1, wherein
said third piston is a stepped piston including
a first portion having a first diameter upon which said controlling piston slides,
a second portion having a second diameter greater than said first diameter,
a first step between said first and second portions providing one of a pair of spaced stops limiting the axial movement of said controlling piston in both directions,
a third portion having a third diameter greater than said second diameter, and
a second step between said second and third portions;
said controlling piston includes
a circular projection extending radially inward adjacent an outlet to said one circuit of said brake systems;
said locking piston includes
a first section having a given diameter extending through said circular projections,
a second section having a diameter greater than said given diameter, and
a step between said first and second sections; and
a sealing ring disposed on said first section adjacent said step cooperating with an adjacent surface of said circular projection to provide a control valve.

11. A device according to claim 10, further including
a housing part fixed to said housing; and
a pressure chamber disposed in said housing part into which the adjacent end of said second section of said locking piston slideably extends said pressure chamber having an inlet coupled to said other circuit of said brake system to enable said adjacent end of said second section of said locking piston to be subjected to pressure in said other circuit of said brake system.

12. A device according to claim 11, wherein
said housing part is disposed coaxial of said axis, closes said housing and is in a controlling relationship with said control spring.

13. A device according to claim 12, wherein
said housing part is screwed into said housing, the depth to which said housing part is screwed into said housing determines the prestress of said control spring.

14. A device according to claim 1, further including
a housing part fixed to said housing; and
a pressure chamber disposed in said housing part into which the adjacent end of said locking piston slideably extends, said pressure chamber having an inlet coupled to said other circuit of said brake system to enable said adjacent end of said locking piston to be subjected to pressure in said other circuit of said brake system.

15. A device according to claim 14, wherein
said housing part is disposed coaxial of said axis, closes said housing and is in a controlling relationship with said control spring.

16. A device according to claim 15, wherein
said housing part is screwed into said housing, the depth to which said housing part is screwed into said housing determines the prestress of said control spring.

* * * * *